(12) United States Patent
Athanas et al.

(10) Patent No.: US 7,072,823 B2
(45) Date of Patent: Jul. 4, 2006

(54) METHOD AND APPARATUS FOR ACCESSING MEMORY USING ETHERNET PACKETS

(75) Inventors: Peter M. Athanas, Newport, VA (US); Henry J. Green, Blacksburg, VA (US); Tom B. Brooks, Blacksburg, VA (US); Kevin J. Paar, Blacksburg, VA (US); Paul D. McFall, Blacksburg, VA (US)

(73) Assignee: Intransa, Inc., San Jose, CA (US)

(*) Notice: Subject to any disclaimer, the term of this patent is extended or adjusted under 35 U.S.C. 154(b) by 809 days.

(21) Appl. No.: 10/113,332

(22) Filed: Mar. 29, 2002

(65) Prior Publication Data

US 2002/0184394 A1   Dec. 5, 2002

Related U.S. Application Data

(60) Provisional application No. 60/280,588, filed on Mar. 30, 2001.

(51) Int. Cl.
*G06F 9/455* (2006.01)
*G06F 12/00* (2006.01)

(52) U.S. Cl. .................... 703/25; 703/28; 709/217; 711/114

(58) Field of Classification Search .............. 703/25, 703/26, 28; 709/217, 231, 206; 711/114, 711/111; 370/355, 392
See application file for complete search history.

(56) References Cited

U.S. PATENT DOCUMENTS

| | | | | |
|---|---|---|---|---|
| 5,828,858 A | * | 10/1998 | Athanas et al. ............. 710/317 |
| 6,658,459 B1 | * | 12/2003 | Kwan et al. ................. 709/217 |
| 6,738,821 B1 | * | 5/2004 | Wilson et al. ............... 709/230 |
| 6,834,326 B1 | * | 12/2004 | Wang et al. ................. 711/114 |
| 2001/0049740 A1 | * | 12/2001 | Karpoff ........................ 709/231 |
| 2003/0091037 A1 | * | 5/2003 | Latif et al. ................... 370/355 |

* cited by examiner

*Primary Examiner*—Thai Phan
(74) *Attorney, Agent, or Firm*—Dorsey & Whitney LLP

(57) ABSTRACT

A data storage system includes memory, a controller, and an Ethernet interface enabling sending and/or receiving Ethernet packets to or from a client system, according to a first protocol. The controller is coupled between the memory and the Ethernet interface and essentially carries out a translation function. Information packets from the client system are translated from a first protocol to a second protocol for use by the memory, and information from the memory is translated from the second protocol to the first protocol for use by the client system as Ethernet packets.

22 Claims, 4 Drawing Sheets

METHOD AND APPARATUS FOR ACCESSING MEMORY USING ETHERNET PACKETS

RELATION TO CO-PENDING APPLICATION

This application claims priority to co-pending U.S. Provisional Patent Application No. 60/280,588, entitled, "Virtual Storage Network," filed Mar. 30, 2001, David C. Lee et al. inventors, which is incorporated herein by reference.

FIELD OF THE INVENTION

The present invention is applicable to the field of loosely coupled storage devices such as magnetic hard disks and more specifically to a disk drive for use with an Ethernet.

BACKGROUND OF THE INVENTION

Devices for storing information and data are known in the art, e.g., magnetic storage, optical storage, solid state storage. Typically information is presented to such storage devices using a known protocol or format, for example ATA (Advanced Technology Attachment).

It is known in the art to communicate information from one computer system to another computer system using Ethernet communications, a format in which information is communicated in packets.

Attempts have been made to present Ethernet information to and from storage devices. One challenge is that Ethernet format requires a first protocol format, e.g., Internet Protocol version 4 (IPv4) or Internet Protocol version 6 (IPv6), while storage devices require information in a second protocol format, e.g., ATA. If such communications could be satisfactorily implemented, numerous computer systems could access numerous storage devices over an Ethernet network. One prior art attempt to do this is a so-called Firewire system, depicted generically in FIG. 1.

One protocol may be layered upon another layer to support communication between systems, the Internet Storage Naming Service (iSNS) is one example. ISNS provides support for discovery, management, and security of block-based storage over IP network. In a sense, iSNS is similar to the Domain Name Service (DNS). ISNS is designed to be a lightweight protocol that can be deployed in ISNS servers, IP Storage switches, and target devices (e.g. disks). The service allows target devices to register their addresses and attributes. Initiators can query the ISNS servers to identify targets that they may use. ISNS RFC is a working document of the Internet Engineering Task Force (IETF).

A Firewire system provides access to an Ethernet network 10, and includes a host computer system 20, and a storage device 30. A network interface card and software are provided for the host computer system to support communication with client system(s) across the Ethernet network. A Firewire protocol supports communication between the host computer system and the storage devices. The computer system translates between the network interface and a storage device. Unfortunately in addition to requiring a computer system and software, Firewire systems have limited scalability in that only a relatively small number (e.g., 63) of storage devices may be coupled to a Firewire system. Further, Firewire systems have limited support for hot swapping storage devices. In addition, such systems require storage devices to be relatively close to the host computer system (e.g., within 35 m). Firewire systems also present numerous single points of failure in that failure of the network card, or network software, or host computer system, or computer software can cause Firewire system failure. Thus, a single point of failure can be described as the failure of a single piece of hardware or software that would causes the entire system to fail. In the prior art, the failure of the host computer system, network connection, and various other system can result in the failure of all attached data storage devices.

Fault tolerant data storage devices are more useful because a failure of one part of a system should not shutdown the entire system. Prior art describes a host computer system housing multiple storage devices with a single coupling to the Ethernet network 10. Consequently, a single failure is potentially fatal to the accessibility of all storage devices associated with the prior art computer system.

Adding or removing data storage devices typically requires the host computer system to be shut down in a specific manner, reconfigured, and restarted. During this process all of the storage devices associated with the host computer system are inaccessible to client systems. Typically, in the prior art storage devices cannot be swapped while the host computer system is operational, e.g., hot swappable.

FIG. 1 depicts a non-Firewire system prior art approach to presenting Ethernet format information to ATA-type format storage devices that is an improvement over Firewire. In FIG. 1, custom built hardware is used that may be added to a host computer system. Specifically, host computer system 20-B includes a custom Ethernet network card 40 and a storage device 30. Unfortunately the custom built hardware suffers shortcomings similar to those enumerated above for Firewire systems.

Fiber Channel technology is known in the art for transmitting data between computer devices at a data rate of up to 1 Gbps, or one billion bits per second. Fiber Channel is suited for connecting computer servers to shared storage devices and for interconnecting storage controllers and drives. Fiber Channel has begun to replace the older Small Computer System Interface (SCSI) as a faster transmission interface between servers and clustered storage devices. Fiber channel is more flexible; devices can be as far as ten kilometers (about six miles) apart if optical fiber is used as the physical medium. Optical fiber is not required for shorter distances, however, because Fiber Channel also works using coaxial cable and ordinary telephone twisted pair. Standards for Fiber Channel are specified by the Fiber Channel Physical and Signaling standard, and the ANSI X3.230-1994, which is also ISO 14165-1.

Fiber Channel offers point-to-point, switched, and loop interfaces. It is designed to interoperate with SCSI, the Internet Protocol (IP) and other protocols, but has been criticized for its lack of compatibility—primarily because (like in the early days of SCSI technology) manufacturers sometimes interpret specifications differently and vary their implementations. Some of the Firewire shortcomings are circumvented by Fiber Channel, including support for the formation a cluster of loosely-coupled disks using a token-ring network (unlike Firewire). However, token-ring networks have limited scaling capability due to the nature of the shared Fiber Channel link. In addition to scalability, Fiber Channel provides for longer network cable lengths. Unfortunately, Fiber Channel still very limiting.

Thus, there is a need for a storage system and a method for storing information accessible to a preferably large number of client systems that may be dispersed across an Ethernet network, according to an Ethernet protocol. In addition to exhibiting large scalability, such system and method should efficiently translate between Ethernet packet format and ATA or equivalent storage device format. Preferably such system should be implementable as a generic storage device whose internal architecture is transparent to client system(s) accessing information stored within the system. Stated differently, such a storage device should transparently enable storage via conventional formats such as ATA or via packet format such as the Ethernet.

The present invention provides such a storage device and method of storing.

SUMMARY OF THE INVENTION

A data storage system includes memory, a controller system, and an Ethernet interface enabling sending or receiving Ethernet packets to or from a client system, according to a first protocol. The controller system is coupled between a memory and the Ethernet interface and essentially carries out a translation function. Information packets from the client system are translated from a first protocol to a second protocol for use by the memory, and information from the memory is translated from the second protocol to the first protocol for use by the client system as Ethernet packets. Optionally the controller system can include a first controller to translate between the first protocol and a controller protocol, and include a second controller coupled between the first controller and the memory to translate between the controller protocol and the second protocol. The Ethernet interface, memory, and controller system are preferably disposed within a common housing.

Other features and advantages of the invention will appear from the following description in which the preferred embodiments have been set forth in detail, in conjunction with the accompanying drawings.

DESCRIPTION OF THE INVENTION

Figure 1:
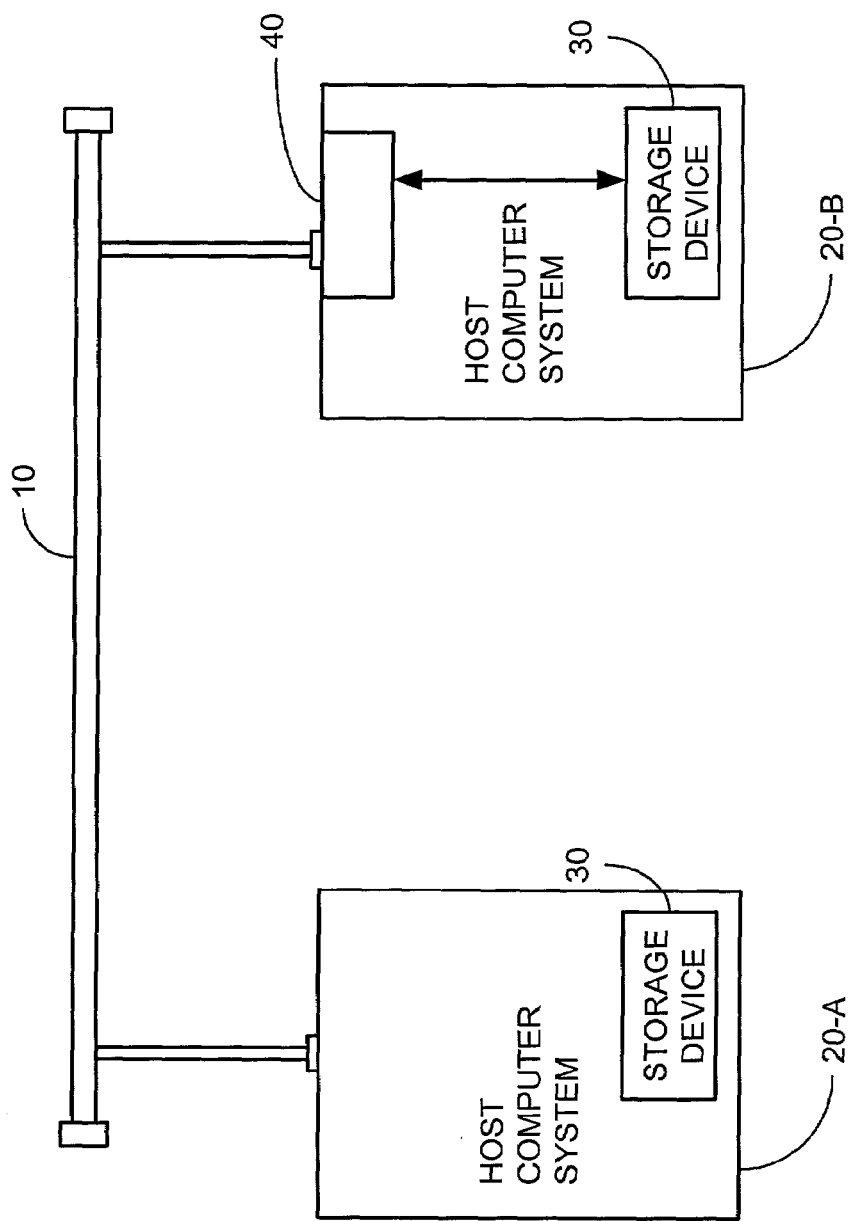
FIG. 1 generally depicts coupling a storage device to an Ethernet, according to the prior art.
Figure 2:
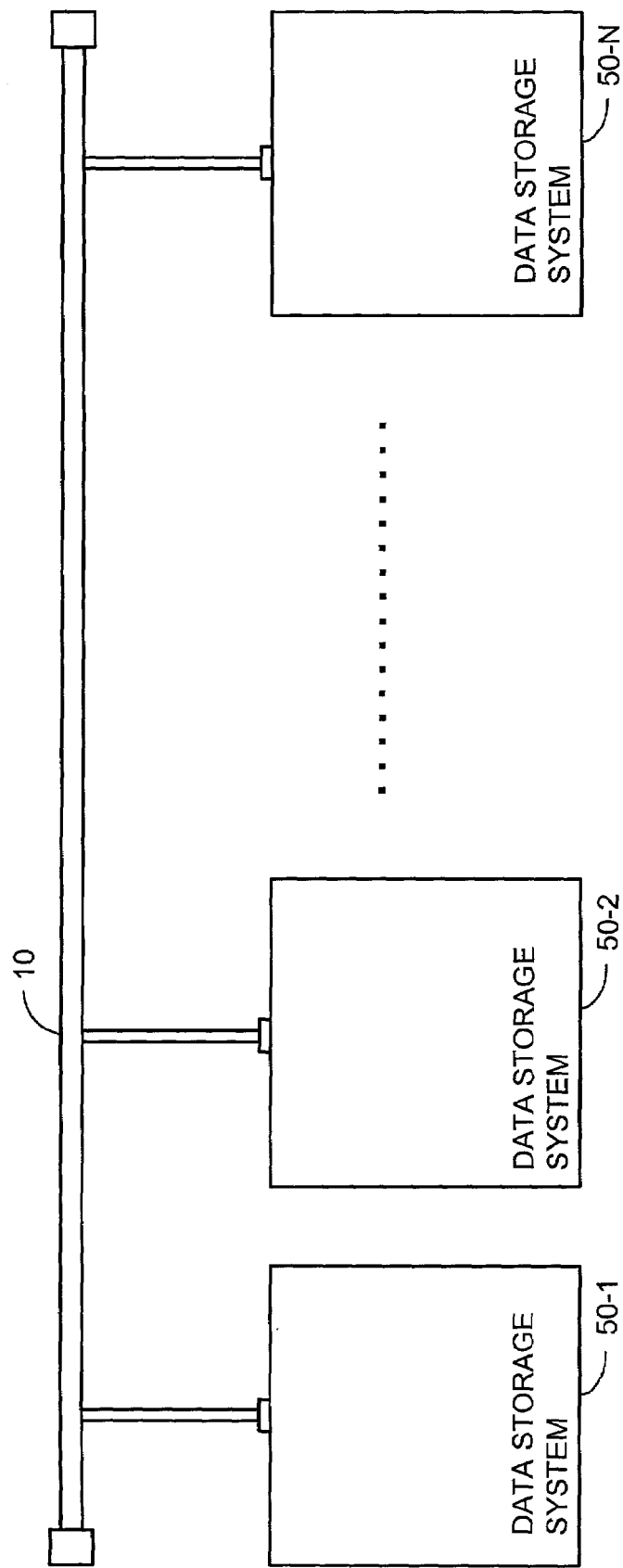
FIG. 2 generally depicts at least one data storage system coupled to an Ethernet network, according to the present invention.

The present invention provides a method and apparatus for accessing memory across an Ethernet network. FIG. 2 depicts data storage systems coupled to an Ethernet network according to an embodiment of the present invention. One or more data storage systems 50, e.g., 50-1, 50-2 . . . , 50-N, can be loosely coupled independently of each other to an Ethernet network 10. The scalability of the present invention is limited by the number of available address that may be assigned across an IP network 10. According to a current IPv4 protocol using 32-bit addresses, about 4 billion addresses could be assigned. According to an IPv6 protocol using 128-bit addresses, a theoretical maximum of about 256 trillion, trillion, trillion addresses could be assigned. The scalability of present invention is virtually unlimited and therefore inherently more scalable than the prior art, whose scalability was limited to about 63 devices.

In the present invention, the actual location of each data storage system relative to an Ethernet network is not constrained to a close proximity and individual data storage systems may be distributed across the entire Ethernet network 10. For example, data storage system 50-1 may be physically located many, many Km, perhaps tens of thousands of Km from the data storage system 50-2. In stark contrast to prior art systems that constrain the physical location of storage devices to a specific geographical area, e.g., 35 m, of the prior art system.

Single points of failure are reduced in the present invention by attaching the data storage system directly to an Ethernet network. With fewer single points of failure, the present invention is considerably more reliable than the prior art. Multiple data storage devices, 50-1, 50-2 . . . , may be independently coupled to an Ethernet network 10. Advantageously, the failure of one or more data storage devices such as 50-1 would not necessarily cause the failure of a second data storage device such as 50-2, thereby improving robustness of the overall system. Fault tolerance is a beneficial aspect of the present invention.

Ethernet devices may be readily coupled and uncoupled from an Ethernet network without powering down the host computer system. Thus, a data storage system with an Ethernet interface has similar advantages and may be swapped with another data storage system and is therefore inherently hot swappable, according to one embodiment. As such, the present invention allows data storage systems to be easily added, removed, or reconfigured. In one embodiment, a data storage system can be replaced by uncoupling its Ethernet connection and coupling the Ethernet connection of another data storage system to the Ethernet network.

Installation of the data storage system may be simplified in that only a power source and an Ethernet connection are required, in contrast to the prior art. Installation in a host computer system according to the prior art is not required. Accordingly, size and mass of the present invention can be significantly reduced in comparison to the prior art that includes a host computer system.

Figure 3:
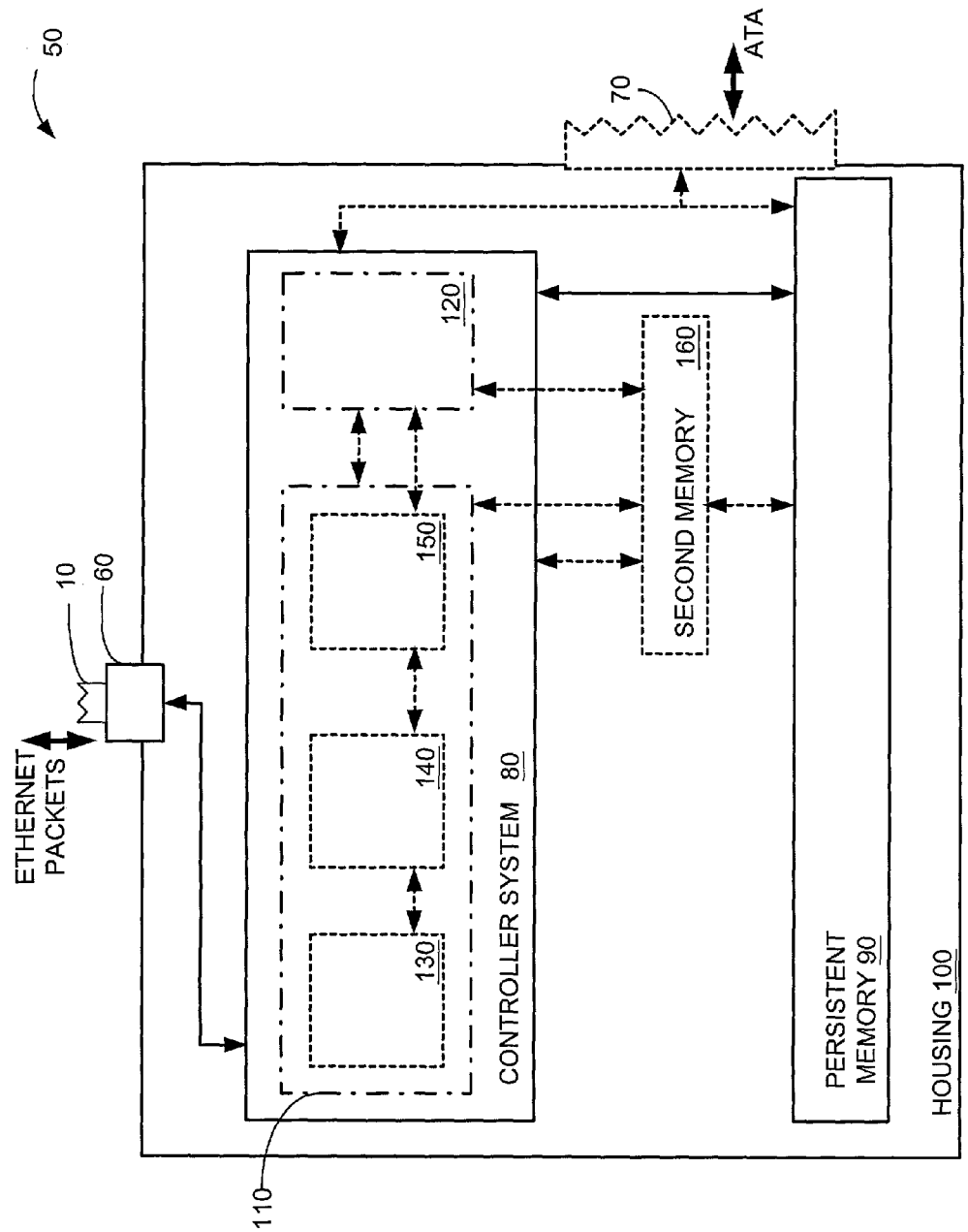
FIG. 3 depicts a data storage system including an Ethernet interface, a controller system, a memory, and a housing, according to the present invention.

Referring now to FIG. 3, a data storage system 50 is coupled with an Ethernet 10 using an Ethernet interface 60. Ethernet packets are sent and received by the data storage system 50 through the Ethernet interface 60.

The data storage system may also be coupled with a computer system using an interface 70 to the memory 90 according to one embodiment. The term memory may include persistent storage, non-volatile storage, or volatile storage. The interface may include without limitation: IDE, SCSI, USB, USB 2, Firewire device, and the like. The computer system may communicate through the interface 70 to the controller system 80, which communicates with the memory 90. The computer system may communicate directly through the interface 70 to the memory 90, according to another embodiment. In one embodiment, the memory 90 is persistent memory.

The data storage system 50 includes an Ethernet interface 60, a controller system 80, a memory 90, and a common housing 100. The Ethernet interface 60 is configured to receive and to send Ethernet packets according to a first protocol, which is in a format useable by a client system. The memory 90 stores and retrieves data according to a second protocol. The controller system 80 is coupled between the Ethernet interface 60 and the memory 90 to translate between the first protocol and the second protocol. The Ethernet interface, memory, and controller system are preferably disposed within a common housing. The memory 90 is capable of forming a response to a request from the client system, including: storing information, retrieving information, and providing status information. The second protocol can support communication with standard memory devices including without limitation: ATA, SCSI, USB, USB-2, Firewire, and the like.

The controller system 80 may include a first controller 110 and a second controller 120. The first controller 110 is coupled to the Ethernet interface to translate between the first protocol and a controller protocol. The second controller 120 is coupled between the first controller 110 and the memory 90. The first controller and second controller communicate with each other according to the controller protocol. The second controller translates between the controller protocol and the second protocol. The second controller can be a memory controller, e.g., ATA, SCSI, USB, USB-2, Firewire, and the like. The controller protocol used for communication between the first controller and the second controller can be similar to the second protocol.

According to one embodiment, the second controller 120 is a standard controller, e.g., an IDE controller, and the memory 90 is the memory typically associated with the selected controller, e.g., an IDE disk drive. The standard controller and corresponding memory may include without limitation: ATA, SCSI, Firewire, USB, RAM, and the like. Additionally, a computer system, or client computer, may be coupled with the second controller 120 to the data storage system 50 through the standard interface 70.

The first controller 110 includes a so-called PHY controller 130, a so-called MAC controller 140, and a translation controller 150, according to one embodiment. The PHY controller 130 translates between the first protocol and a PHY protocol. The MAC controller translates between the PHY protocol and a MAC protocol. The translation controller translates between the MAC protocol and the second protocol. The PHY controller is coupled between the Ethernet interface and the MAC controller. The PHY controller and the Ethernet interface communicate according to the first protocol. The MAC controller is coupled between the PHY controller and the translation controller. The MAC controller and the PHY controller communicate with each other according to the PHY protocol. The translation controller is coupled between the MAC controller and the second controller. The translation controller and the MAC controller communicate with each other according to the MAC protocol. The translation controller 140 and the second controller 120 communicate with each other according to the controller protocol. A commercially available PHY controller and MAC controller may be used. (In the prior art functionality of the PHY controller and MAC controller are typically associated with an Ethernet network interface card in a host computer system 20-A or 20-B.)

In the present invention, the Ethernet PHY 130 can communicate with the physical Ethernet interface to send and to receive Ethernet packets. The Ethernet MAC 140 can communicate with the Ethernet PHY 130 to send and to receive Ethernet packets. Preferably, the Ethernet MAC 140 can analyze Ethernet packets, and carry-out error checking of the packets using known techniques. Functionality of the Ethernet PHY 130 and the Ethernet MAC 140 are known in the art and thus are not fully described herein.

The translation function 150 can communicate with the Ethernet MAC 140 to send and receive information from client systems. The translation function 150 can send and receive information through the Ethernet MAC 140. The translation function may determine if the information includes data and/or commands. The translation function 150 may translate information received from the Ethernet MAC 140 into a format that can be communicated to the second controller 120 according to the controller protocol. In one embodiment commands communicated to the second controller 120 are separated from data communicated to the second controller 120. The translation function 150 may translate information received from the second controller into a format that can be communicated to the Ethernet MAC 140 according to the MAC protocol. The translation function 150 may support bidirectional communication between the Ethernet MAC and the second controller.

The data storage system may include a second memory 160, according to one embodiment. The second memory 160 may support communication between components within the data storage system, and can support communication between the controller system 80 and memory 90. The second memory may support communication between the first controller 110 and second controller 120. Further, the second memory may support communication between any selected components including: Ethernet interface 60, controller system 80, memory 90, first controller 110, second controller 120, PHY controller 130, MAC controller 140, translation controller 150, and interface 70, according to the various embodiments. The second memory 160 may advantageously reduce required communication between any selected components by providing a buffer area.

For example, communication between the first controller 110 and the second controller 120 can use the second memory 160 to buffer Ethernet packets received before the second controller 120 communicates the client system request to the memory 90. Packets associated with a client system request, such as a to store a file, may be stored to verify the receipt of all corresponding packets that are associated with the file before the set of packets or corresponding information may then be transferred to the second controller 120. Instead of communicating each packet individually they may be stored in the shared second memory 160. The corresponding storage location, or buffer location, may be communicated to the second controller 120 instead of transferring the information directly.

Alternatively, the second memory can store or verify Ethernet packets before the data storage system forms a response to a request by a client system, such as verifying the contents of a file to be saved. The second memory can collect or verify that all packets associated with a file have been received before the file is communicated to the memory 90. Once a file to be stored is verified then the data storage system may save the file without concern for missing Ethernet packets.

Alternatively, the second memory may buffer a response to a request from a client system before the response is formed into Ethernet packets according to the first protocol.

Within the present invention protocols may be layered. In one embodiment, TCP/IP packets may be used to support communication by encapsulating a storage device protocol (such as SCSI or ATA). A system associated with the client system may encapsulate SCSI communication within Ethernet packets, which are transmitted to a data storage system, which extracts the encapsulated SCSI communication. Using a variety of protocols in a layering approach may facilitate communication between a client system and a data storage system. The storage device protocol may be encapsulated within TCP/IP packets, and layered upon the Internet Protocol (IP) which is layered upon Ethernet. iSCSI is one protocol that encapsulates both the storage device layer (SCSI-3) and the networking layers (TCP/IP). Advantageously, the present invention may support a discovery and management protocol such as ISNS, which is name service layered upon TCP/IP. Because the invention supports lower-layer protocols such as Ethernet and IP, it can also support several higher-layer protocols such as ISCSI, ISNS, or other non-standard protocols.

Figure 4:
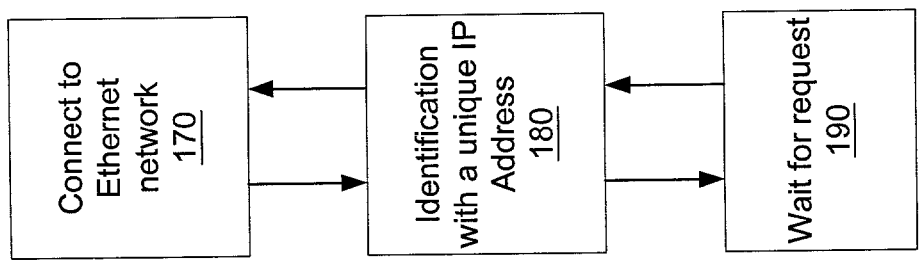
FIG. 4 depicts a process of coupling a data storage system to an Ethernet network, according to the present invention.

FIG. 4 depicts the activation of a data storage system according to one embodiment. The data storage system 50 is coupled to a packet based Ethernet network 170, e.g., IPv4 network. The data storage system is identified with an Internet Protocol (IP) address 180, e.g., 172.30.1.2, which uniquely identifies the data storage system on the Ethernet network. The IP address allows Ethernet packets to be sent to this data storage system.

IP addresses of a data storage device can be either static or dynamic. With a static IP address, the address is the same every time the data storage device is coupled to the IP network. With a dynamic IP address, the data storage system is assigned an IP address by another device within the Ethernet network according to a pool of unassigned IP addresses. A dynamic IP address is typically assigned every time the data storage device is connected to the Ethernet network. As a result, the dynamic IP address of a data storage device may be only temporary. As noted, the number of potential IP addresses is virtually without limit. Thus a user wishing to access storage system 50-x via the Internet, could specify the unique IP address for system 50-x and could thus access storage system 50-x, as though it were a local storage device. This flexibility is not to be found in the prior art.

Subsequently the data storage system 50 typically waits for a request 190 from a client system. A variety of requests may be made by a client system. Typical requests include storing information, retrieving information, and requesting status information. A client system may read or write a file, create or delete a file or directory structure, or perform other operations commonly performed in conjunction with a memory or Ethernet device. A request may also modify the IP address of the data storage system 50.

Responses by the data storage system are typically supported by the Ethernet protocol, which identifies both the sender and intended recipient of an Ethernet packet. A request by a client system would identify the data storage system as the intended recipient and the client system as the sender. Responses are typically sent to the client system sending the request as identified within the Ethernet packets received by the data storage system.

Information may be stored or accessed by a client system including data and commands saved in the memory 90, the controller system 80, or the second memory 160. For example, a file received by the data storage system and stored in the memory 90. Alternatively, an IP address identifying the data storage system may be received and stored in the controller system 80 to uniquely identify the data storage system.

Figure 5:
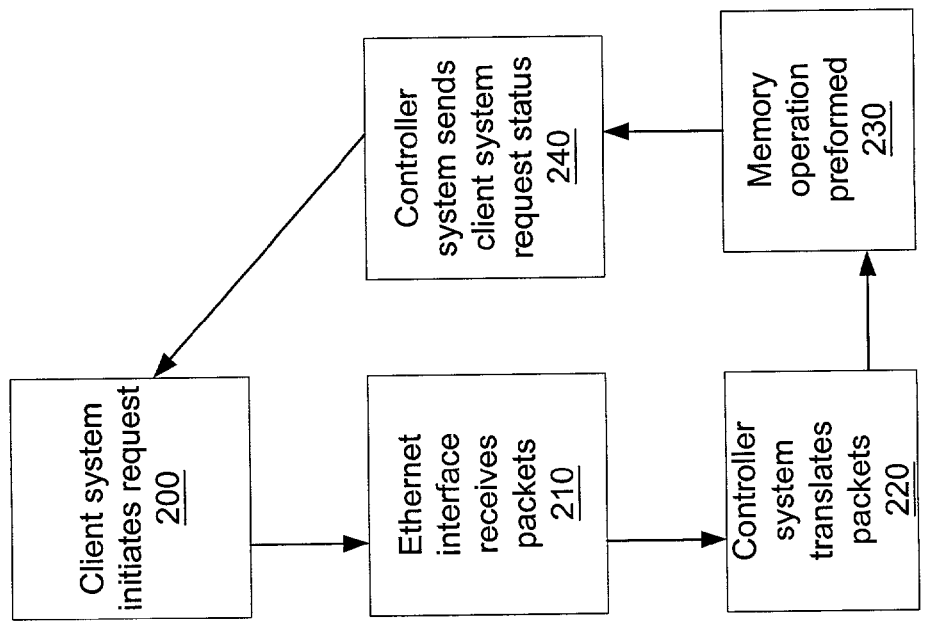
FIG. 5 depicts a process initiated by a client system to access a data storage system, according to the present invention.

FIG. 5 depicts a process of storing a file as initiated by a client system. A client system may request that a file be stored on a data storage system by initiating a request 200. The data storage system is uniquely identified by an IP address. A message containing the file to be stored is sent to the specific IP address of the data storage system. The file may potentially be split into multiple Ethernet packets. Accordingly the data storage system may receive a plurality of Ethernet packets representing the file. A network protocol, e.g., TCP/IP, may handle the communication between the client system and the data storage system. The network protocol is generally understood in the art and is not described herein.

The Ethernet interface of the data storage system typically receives the Ethernet packets 210. After the Ethernet packets are received, the controller system translates the Ethernet packets received 220 into information that can be communicated to a memory. The Ethernet packets may be buffered and verified. The information is typically sent to the memory 90 or a second controller 120 to perform the requested operation 230. Status information indicating the state of the request may be determined by the controller system and sent to the requesting client system 240.

Additional processing may be required to support access to the data storage system. A user name, password, secret key, or other security measure may be used to limit access to a given data storage system.

In use, the internal architecture of the data storage system is transparent to the client system(s). The data storage system can be used to communicate information in Ethernet packet format, and the data storage system can be coupled to an Ethernet network and thereby be accessible to multiple client systems.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A data storage system for attaching to an Ethernet network to allow access by client systems dispersed across the Ethernet network, comprising:

an Ethernet interface coupled to the Ethernet network and configured to receive and to send Ethernet packets according to a first protocol, said first protocol being a format useable by the client systems;

a memory to store and to retrieve data according to a second protocol;

a controller system, coupled between said Ethernet interface and said memory and configured to translate information between said first protocol and said second protocol; and a housing in which said Ethernet interface, said memory, and said controller system are disposed; wherein said memory forms a response to a request by one of said client systems, said response including at least one of (a) storing information, (b) retrieving information, and (c) providing status information; and wherein the data storage system is configured to directly attach to the Ethernet network without association with any host computer in the Ethernet network.

2. The data storage system of claim 1, wherein said memory is a persistent memory device.

3. The data storage system of claim 1, wherein said controller system includes:

a first controller, coupled to said Ethernet interface, to translate between said first protocol and a controller protocol; and a second controller, coupled between said first controller and said memory; wherein said first controller and said second controller communicate with each other according to said controller protocol, and said second controller translates between said controller protocol and said second protocol.

4. The data storage system of claim 3, further including:
a second memory, disposed in said housing, coupled between said first controller and said second controller; wherein said second memory buffers said request from said client system before said second controller translates to said second protocol.

5. The data storage system of claim 3, further including:
a second memory, disposed in said housing, coupled between said first controller and said second controller; wherein said second memory buffers said response to said request from said client system before said response is formed into Ethernet packets according to said first protocol.

6. The data storage system of claim 5, wherein said second memory is a volatile memory device.

7. The data storage system of claim 3, wherein said second controller is an ATA Controller.

8. The data storage system of claim 3, wherein the first controller comprises:
a PRY controller to translate between said first protocol and a PRY protocol;
a MAC controller to translate between said PHY protocol and a MAC protocol; and
a translation controller to translate between said MAC protocol and said second protocol; wherein said PHY controller, coupled between said Ethernet interface and said MAC controller, wherein said PHY controller and said Ethernet interface communicate according to said first protocol;
wherein said MAC controller is coupled between said PHY controller and said translation controller, said MAC controller and said PHY controller communicate with each other according to said PHY protocol; said translation controller is coupled between said MAC controller and said second controller, said translation controller and said MAC controller communicate with each other according to said MAC protocol, and said translation controller and said second controller communicate with each other according to said second protocol.

9. The data storage system of claim 1, wherein said memory further comprises:
a storage unit to store and to retrieve data according to a storage protocol; and
a storage controller, coupled between said controller system and said storage unit, said storage controller translating between said second protocol and said storage protocol.

10. The data storage system of claim 7, further including:
a second memory, disposed in said housing, coupled between said controller system and said storage controller; wherein said second memory buffers said request from said client system before said storage controller translates to said storage unit protocol.

11. The data storage system of claim 7, further including:
a second memory, disposed in said housing, coupled between said controller system and said storage controller; wherein said second memory buffers said response to said request from said client system before said response is formed into Ethernet packets according to said first protocol.

12. The data storage system of claim 1, wherein said memory includes at least one selected from a group consisting of (a) an ATA disk drive, (b) a SCSI disk drive, (c) a Firewire disk drive, (d) a USB disk drive, (e) a Fiber Channel Arbitrated Loop disk drive, (f) a hard disk drive, (g) solid state memory, and (h) optical storage.

13. A disk drive for use with an Ethernet network comprising:
an Ethernet interface to receive and to send Ethernet packets according to a first protocol, said first protocol being a format useable by a client system in the Ethernet network;
a memory to store and to retrieve data according to a second protocol, wherein the memory is an IDE hard drive;
a first controller, coupled to said Ethernet interface, to translate between said first protocol and a controller protocol, said first controller including:
a PHY controller to translate between said first protocol and a PHY protocol;
a MAC controller to translate between said PHY protocol and a MAC protocol; and
a translation controller to translate between said MAC protocol and said controller protocol; wherein said PHY controller is coupled between said Ethernet interface and said MAC controller and said PHY controller communicates with said Ethernet interface according to said first protocol; wherein said MAC controller is coupled between said PHY controller and said translation controller, wherein said MAC controller and said PHY controller communicate with each other according to said PHY protocol; wherein said translation controller and said MAC controller communicate with each other according to said MAC protocol;
a second controller, coupled between said first controller and said memory, wherein the second controller is an IDE controller; wherein said first controller and said second controller communicate with each other according to said controller protocol, and said second controller translates between said controller protocol and said second protocol; wherein said translation controller is coupled between said MAC controller and said second controller; wherein said translation controller and said second controller conmiunicate with each other according to said second protocol; and
a housing in which said Ethernet interface, said memory, said first controller, and said second controller are disposed;
wherein said disk drive is configured to directly attach to said Ethernet network without association with a host computer; and wherein in response to a request by said client system, said memory forms a response including at least one of (a) storing information, (b) retrieving information, and (c) providing status information.

14. A disk drive for use with an Ethernet network, comprising:
an interface for receiving and sending Ethernet packets according to a first protocol, said first protocol being a format useable by a client system in the Ethernet network;
a memory to store and to retrieve data communicated to and from said memory according to a second protocol;
means coupled between said Ethernet interface and said memory for translating between said first protocol and said second protocol; and
a housing, in which said means for interface-receiving and interface-sending, said memory, and said means for translating are disposed; wherein said disk drive is configured to attach directly to an Ethernet network without association with a host computer, and said memory forms a response to a request from said client system, said response including at least one of (a) storing information, (b) retrieving information, and (c) providing memory status information.

15. The data storage system of claim 14, wherein said means for translating includes:
a first means for translating, disposed in said means for housing, coupled to said Ethernet interface, between said first protocol and a controller protocol; and
a second means for translating, disposed in said means for housing, coupled between said first means and said memory, between said controller protocol and said second protocol; wherein said first means and said second means communicate with each other according to said controller protocol.

16. The data storage system of claim 15, further including:
a second memory, disposed in said means for housing, coupled between said first means and said second means; wherein said second memory buffers said request from said client system before second means translates said request to said second protocol.

17. A method for storing data in an Ethernet network to allow access by client systems in the Ethernet network, comprising:
attaching directly a disk drive to the Ethernet network without associating the disk drive to a host computer in the Ethernet network, the disk drive including:
an Ethernet interface to receive and to send Ethernet packets according to a first protocol, said first protocol being a format useable by client systems;
a memory to store and to retrieve data according to a second protocol;
a controller system coupled between said Ethernet interface and said memory, said controller system translating information between said first protocol and said second protocol; and
a housing in which said Ethernet interface, said memory, and said controller system are disposed; and
receiving and sending Ethernet packets through the Ethernet interface; and
wherein said memory forms a response to a request from a client system, said response including at least one of (a) storing information, (b) retrieving information, and (c) providing memory status information.

18. The method of claim 17, wherein the memory includes a persistent memory to store and to retrieve data according to the second protocol.

19. The method of claim 17, wherein the controller system includes:
a first controller system, coupled to said Ethernet interface, to translate between said first protocol and a controller protocol; and
a second controller system, coupled between said first controller and said memory, said second controller translating between said controller protocol and said second protocol; wherein said first controller and said second controller communicate according to said controller protocol.

20. The method of claim 19, wherein the disk drive further includes:
a second memory, coupled between said first controller system and said second controller system; wherein said second memory buffers said request from said client system before said second controller translates to said second protocol.

21. The method of claim 20, wherein said second memory is volatile memory.

22. The method of claim 19, wherein the first controller system includes:
a PHY controller to translate between said first protocol and a PHY protocol;
a MAC controller to translate between said PHY protocol and a MAC protocol; and
a translation controller to translate between said MAC protocol and said second protocol;
wherein said PHY controller is coupled between said Ethernet interface and said MAC controller, wherein said PHY controller and said Ethernet interface communicate according to said first protocol; said MAC controller is coupled between said PRY controller and said translation controller; said MAC controller and said PRY controller communicate with each other according to said PRY protocol; said translation controller is coupled between said MAC controller and said second controller, said translation controller and said MAC controller communicate with each other according to said MAC protocol, and said translation controller and said second controller communicate with each other according to said second protocol.

* * * * *